May 21, 1957 J. J. STAFFORD 2,792,658
FISHING APPARATUS
Filed Nov. 7, 1952 2 Sheets-Sheet 1
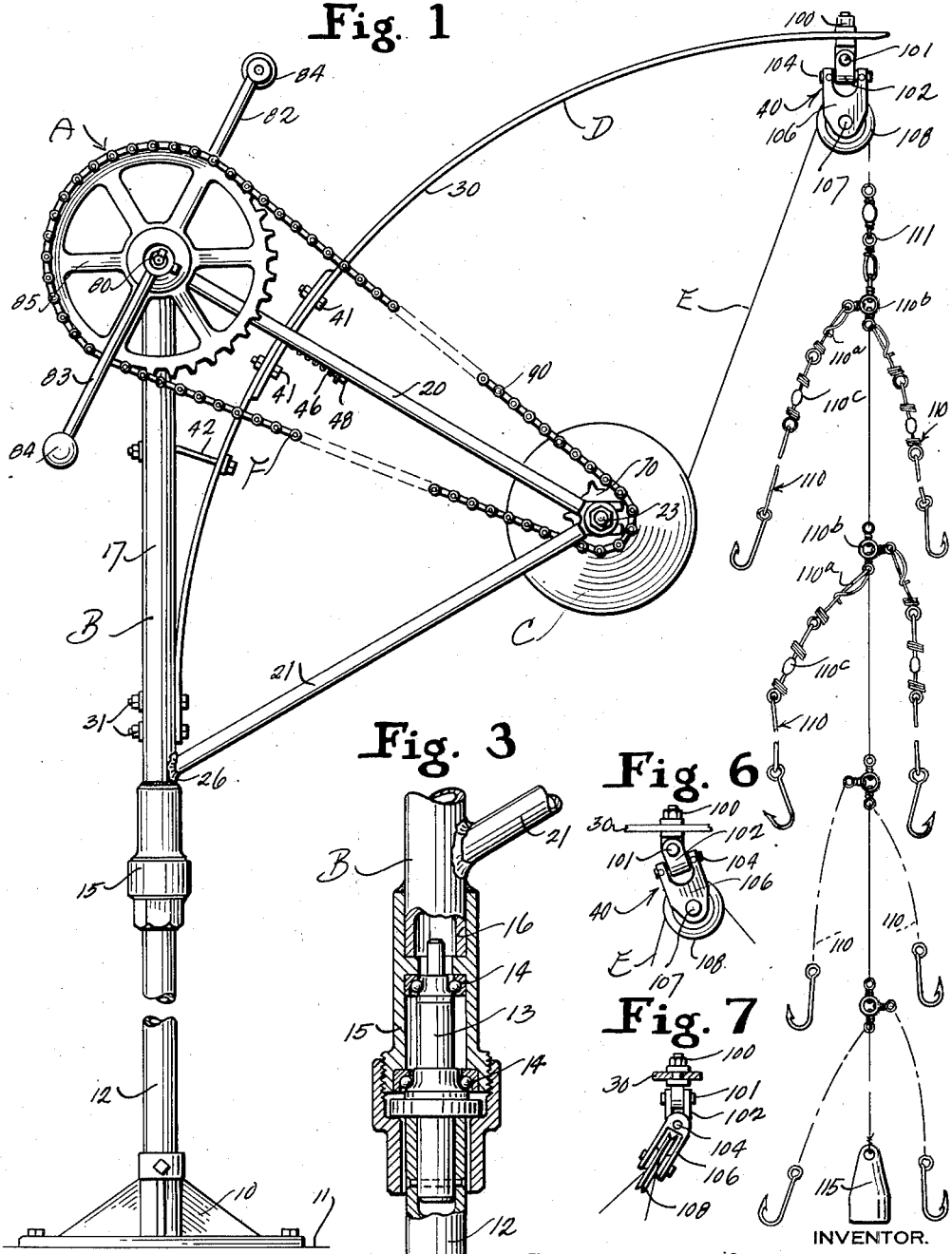
INVENTOR.
JESSE J. STAFFORD
BY *Lancaster, Allwine & Rommel*
ATTORNEYS.

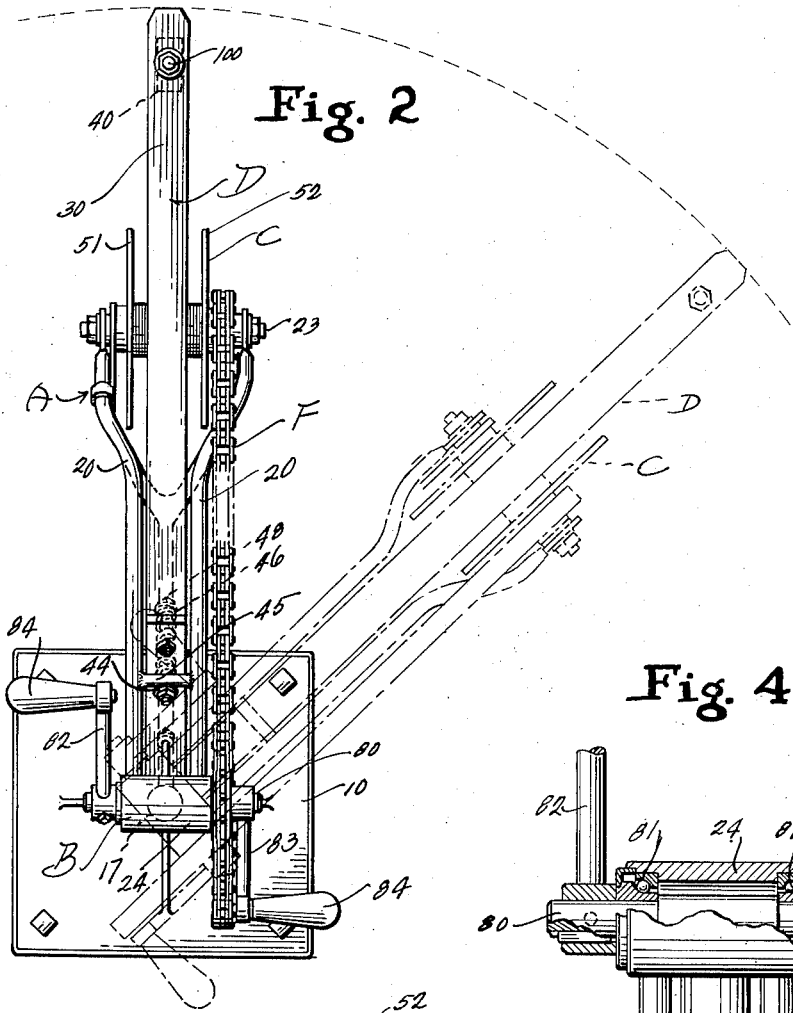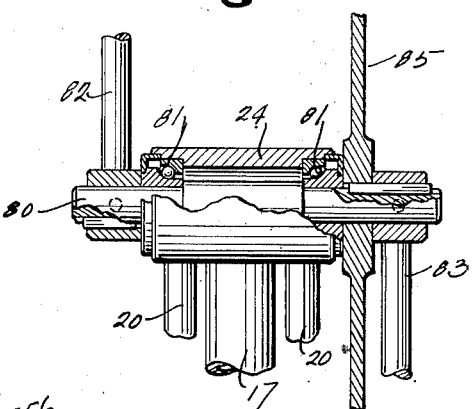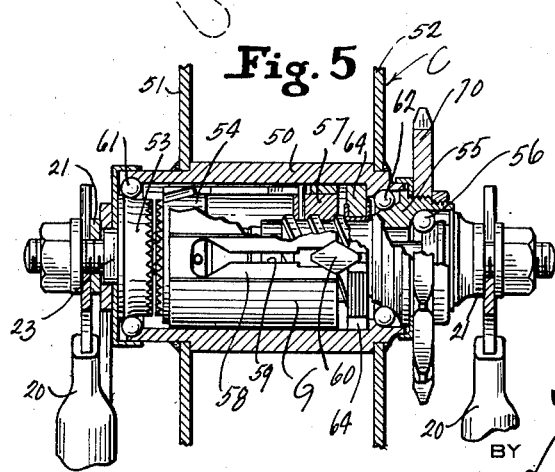

United States Patent Office 2,792,658
Patented May 21, 1957

2,792,658
FISHING APPARATUS

Jesse J. Stafford, Pensacola, Fla., assignor of one-half to Henry W. Sanborn, Pensacola, Fla.

Application November 7, 1952, Serial No. 319,237

13 Claims. (Cl. 43—4)

This invention relates to an improved fishing device for expeditiously catching large quantities of fish with ease and positive control.

The primary object of this invention is the provision of fishing apparatus adapted to be mounted on a support, such as a boat or platform, and including an improved rod or arm structure, a fishing line reel, and means for operating the latter under such circumstances that a large number of hooks may be supported on the line for fishing in both deep and shallow waters whereby an individual can catch large numbers of fish of varying size under perfectly controlled conditions.

Other objects and advantages of this invention will be apparent during the course of the following detailed description.

In the accompanying drawings forming a part of this specification, and wherein similar reference characters designate corresponding parts throughout the several views:

Fig. 1 is a fragmentary side elevation view of the improved fishing device.

Fig. 2 is a top plan view of the fishing device, showing in dotted lines how the rod can be swung.

Fig. 3 is a fragmentary sectional view showing how the rotatable standard of the frame structure of the apparatus is mounted.

Fig. 4 is a fragmentary view, partly in section, of the crank mounting structure for operating the fishing reel.

Fig. 5 is a fragmentary view, partly in section, showing the brake mechanism for the reel.

Fig. 6 is a side elevation of a universal type of pulley-swivel for the fishing device line.

Fig. 7 is a front elevation of the pulley-swivel device for the line.

In the drawings, wherein similar reference characters designate corresponding parts throughout the several views, the letter A may generally designate the fishing apparatus. It includes a frame structure B, supporting a line reel C; a fishing rod or arm structure D; a line E; power transmitting means F for operating the reel C, and a brake structure G associated with the reel.

The frame structure B preferably includes a base 10 adapted to be bolted or otherwise secured to a boat deck or a platform 11. An upright 12 is mounted upon the base having a top supporting pin 13 adapted to receive thereon antifriction bearings 14 housed within a two-part sleeve structure 15. The latter at the top has a socket 16 adapted to receive a standard 17 fixedly secured therein. This provides an antifriction construction for swivelling the standard 17 upon the stationary member 12 so that the standard 17 can rotate through 360°.

The frame structure B furthermore includes upper and lower reel supporting arm structures 20 and 21, each including a pair of arm sections which at their outer ends are joined together for rotatably supporting the stationary shaft 23 upon which the brake mechanism G and the reel C are mounted. The top of standard 17 has a horizontal fixed sleeve 24 to which the upper ends of the arm sections 20 are also fixedly connected. The two arms of the lower arm structure 21 are welded or otherwise secured at 26 to the lower portion of the standard 17 above the swivel connection with base upright 12. The upper and lower arm structures 20 and 21 converge from their connections with the standard 17 and at their outer ends both are detachably and rigidly connected to the shaft 23 of the reel structure.

The fishing arm or rod structure D preferably comprises a strong flat leaf spring type steel body portion 30 secured at its lower end by bolts or other means 31 to the standard 17 immediately above the swivel structure of the standard. It is flexible and resilient and extends upwardly between the two sections of the upper frame member 20, as shown in Fig. 2, and thence arcuates upward and forward, and at its free end supports a swivel and pulley structure 40 over which the line E is trained. This leaf spring body 30 may comprise a plurality of sections or even be telescopic or extensible. In the drawings, it is shown as comprising two sections bolted together at 41. It is very strong and flexible and normally assumes an arcuate stationary position as shown in Fig. 1. The body 30 may be connected by a bolt structure 42 to the standard 17 close to its lower end, for reinforcing support. Intermediate its ends it has a relief spring structure, including a bolt 44 (shown in Fig. 2) connected to a cross piece 45 between the two sections of the arm structure 20. This bolt 44 extends forwardly and supports a compressed spring 46, shown in Figs. 1 and 2; the outer end of the bolt 44 having a detachable nut 48 to hold the spring compressed against the cross piece 45 of the frame. The spring 46 is for the purpose of buffing quick shock loads placed upon the machine incident to sudden pull of the fish load, either because the load directly causes the imposition of shock or because of boat trolling maneuvering, etc. This relieves shock upon the body 30.

The reel structure C, in addition to the brake mechanism G which comprises a part thereof, principally includes a hub 50 rotatably mounted by the brake structure upon the shaft 23; side flanges 51 and 52 being fixedly attached to the hub 50 to form a channel for receiving the line E in wound relation upon the hub.

The brake mechanism G is of the Morrow type, including a fixed axle shaft 23 having a brake anchor member 53 threaded thereon. A brake supporting and actuating member 54 is loosely mounted on the axle 23 adapted to be moved into clutching engagement with the anchor member 53. A driving member 55 is journaled on the axle 23, as indicated at 56. It has threaded thereon a brake actuating nut 57. A cylindrical brake member 58 rests at its ends on the brake actuating members 54 and 57. This member 58 has longitudinal slots 59 therein opening from each end, in accordance with the well known principle of the Morrow brake. These slots at their open ends are engaged by tapered expanding lugs 60, which are located on the clutch operating members 54 and 57. The hub 50 has an interior cylindrical surface of greater diameter than the normal diameter of the brake member 58. It is journaled at one end on the anchoring member 53, at 61, and at its other end on the driving member 55, at 62. The driving connection between the driving member 55 and hub 50 is provided in the form of segmental clutch members 64 adapted to be wedged into engagement with the interior of the hub 50 by means of the adjacent tapered portions of lugs 60 on the nut 57.

In the operation of the brake structure, backward rotation of the driving member 55 causes the brake actuating nut 57 to move to the left of the position shown in Fig. 5, thus moving the brake assembly to the left until the actuating member 54 enters into clutching engagement with the anchor member 53. Further movement of the nut 57 to the left causes the wedges 60 to enter the slots 59. This expands the sleeve 58 into frictional engagement with the interior of the hub 50.

The driving member 55 is provided with a sprocket wheel 70 detachably keyed thereon.

The power transmitting means F includes a shaft 80 rotatably supported by antifriction bearings 81 in the sleeve 24 of the frame B, and extends at its ends beyond that sleeve where the same is provided with a pair of crank arms 82 and 83 extending in diametrically opposed relation. The arms 82 and 83 may be provided with handles 84. If desired, the shaft 80 may be driven by some motor or power mechanism under the control of an operator. The shaft 80 is provided with a sprocket wheel 85 keyed thereon, of greater pitch diameter than the sprocket wheel 70. A power transmitting chain 90 is trained over both sprocket wheels.

The line E may be of any approved nature. Due to the extreme loads which the same will support, it may be on monel metal, copper, stainless steel, brass or any other flexible wire readily windable upon the reel hub between the flanges 51 and 52.

The pulley type swivel 40 is of unique construction, including a universal joint type structure comprising a supporting bolt 100 having a horizontal shaft portion 101 at the lower end thereof. The bolt 100 is rigidly but detachably connected to the outer end of the flexible leaf type rod arm 30, and a clevis 102 is swivelled upon the shaft or pin 101. The clevis 102 at its lower end also supports a shaft 104, horizontally, but in right angled relation to the axis of the shaft or pin 10, and on the shaft 104 is pivotally supported a pulley block swivel 106. The bifurcated swivel 106 has a shaft 107 thereon rotatably supporting a pulley 108. The shafts 101 and 107 are transverse to the length of the rod 30, and the shaft 104 is parallel thereto, at the outer end of the rod.

The line E is trained from the reel C over the pulley 108. The line E is provided with multiple hook structures 110, swivelly connected to the line at 111, and the free end of the line may support a sinker 115 of the desired weight. The individual hook structures each include a safety pin type of quick connector 110ª for attachment to the three way line swivel 110ᵇ. A swivel 110ᶜ is interposed between the hook leader and snap 110ª.

The machine of this invention has been used with lines and multiple hooks operating at great water depths. The hooks may all be of the same size or vary from extremely large ones at the bottom of the line near the weight 115 to the top of the line, near the swivel 111, where the same may be smaller, for the purpose of catching various sized fish according to the depth at which normally located.

In operation, for trolling, the swivel sleeve 15 will permit the standard 17 to rotate to the proper position for facing the rod 30 in the direction counter to travel of the vessel upon which the apparatus is mounted. The universal type swivel connection 40 for the line will also enable the line to assume a proper position under all circumstances of turn, dipping, and other movements of the rod as well as the ship.

The line E will play out as the reel free wheels. To reel in the line it is merely necessary to rotate the shaft 23 and the reel therewith by means of turning the crank arms. Back rotation of the shaft 23 will move the driving member 55 therewith and cause braking action upon the reel hub.

It is possible to use the machine under sporting conditions by deft manipulation of the power transmitting mechanism and the brake, for hauling in extremely large fish, such as whales, sharks, etc. The power transmitting mechanism through the chain and sprocket wheels provides reduction gearing, the degree of which may be varied to suit circumstances.

With the improved fishing apparatus it is possible to make large and weighty hauls of fish quickly and with ease.

In lieu of the sprocket and chain connection other gearing may be used of a chainless type, completely enclosed. It will of course be understood that a guard may be placed around the sprocket wheels and chain to prevent catching of the clothing of fishermen and to protect the gearing against collection of debris.

Various changes in the shape, size, and arrangement of parts may be made to the form of invention herein shown and described, without departing from the spirit of the invention or scope of the claims.

I claim:

1. A fishing device comprising a supporting base, an upright standard rotatably mounted on said base for axial turning, a forwardly extending frame arm extension connected to the standard, a reel rotatably mounted upon said extension and positioned forwardly of and remote from the standard, a strongly resilient flexible rod connected to said standard and extending forwardly from said standard, a line for said reel, swivel means at the outer end of the rod for trained travel of the line thereover, brake means associated with the reel for braking the action thereof, and a power actuation reduction gearing connected upon the standard and operatively connected to the reel for operating the latter.

2. A fishing device as claimed in claim 1 wherein additional relief spring means is provided upon said extension for resiliently supporting the rod member against excessive fish shock loads.

3. A fishing device comprising a supporting base, an upright standard rotatably mounted upon said base, upper and lower frame arms rigidly connected with said standard respectively at the upper and lower ends thereof and extending away therefrom forwardly in convergent relation, a reel rotatably mounted at the outer points of convergence at the ends of said frame arms, a flexible resilient rod mounted upon said standard, a line wound on the reel, swivel means on the end of the rod over which the line is trained for movement, and power transmitting and power reduction means mounted upon said standard and operatively connected with the reel for rotating the latter.

4. A fishing device as claimed in claim 3 wherein a brake construction mechanism is provided including means operable for brake application upon backward rotation of the power transmitting means, to prevent rotation of the reel.

5. A fishing device including a supporting base, an upright standard rotatably mounted axially upon said base, upper and lower arms rigidly connected with the lower and upper portions of said standard and converging together, a reel rotatably mounted at the convergent ends of said upper and lower arms, a flexible resilient rod connected at its lower end to the lower end of said standard and extending upwardly therefrom in bowed relation over and forwardly of the reel, a line wound upon said reel, means on the outer end of the rod forwardly of the reel for the training of the line thereover, and power transmitting means carried by the standard for operating said reel.

6. A fishing device as claimed in claim 5 including a brake incorporated with the wheel and operable upon back movement of the power transmitting means to prevent line paying out rotation of the reel.

7. A fishing machine comprising a supporting base, a vertical standard rotatably mounted for axial rotation upon said base, a laterally extending frame arm structure connected with the standard, a reel rotatably mounted upon the outer end of the laterally extending arm structure remote from the standard, reel operating means rotatably mounted upon the upper end of the standard including a shaft having a sprocket wheel connected therewith and a crank for operating the shaft and sprocket wheel, a wheel connected with the reel and rotatable therewith, a belt trained over said wheels for rotating the reel upon rotation of the crank, and resilient and flexible rod means carried by the standard having means thereon for the trained reception of a line from the reel thereover.

8. In a machine for catching huge weight loads of fish the combination of an upright rigid supporting post construction, an upright member rotatably mounted upon the post construction for rotation on an upright axis, a rigid lateral extension connected to said member and rotatable therewith, a line receiving reel rotatably mounted at the outer end of said lateral extension, speed reduction gearing rotatably mounted upon said reel and upon the upright member remote from the reel, belt means connecting said gearing, crank means for rotating the gearing upon said member and through the belt means the gearing of the reel, a strongly resilient rod connected to said member below the gearing thereon and extending upwardly in bowed relation outwardly from said upright over the reel and having its outer end located beyond said reel, and guide means on the outer end of said rod for receiving the line from said reel.

9. A fishing machine as described in claim 8 wherein spring means is provided upon said reel supporting extension and connected to the rod for buffing fish load shocks in addition to the natural resiliency of said rod.

10. A fishing machine as described in claim 8 wherein an automatically operable brake means is provided in associated relation with the gearing for braking the paying out action of the line upon reverse movement of the gearing.

11. A fishing device comprising a supporting base structure, an upright standard rotatably mounted upon the base structure for axial rotation thereon, a resilient rod member connected to the standard, a reel, frame means connecting the reel to the standard appreciably spaced forwardly from the standard and the location of connection of the rod, a line wound on the reel, means on the outer end of the rod for trained movement of the line thereon, means on the standard for rotating the reel, and additional spring means upon the frame for absorbing excessive fish load shocks applied upon said rod.

12. In a fishing device the combination of a supporting frame, a fishing line receiving reel rotatably supported forwardly upon said frame, a brake mechanism incorporated as a part of said reel which upon reverse rotation of the reel operates to prevent line paying out rotation of said reel, a wheel rotatably mounted upon the frame appreciably spaced rearwardly of the reel, a belt trained over said wheel and rotatably connected to the reel for operating the reel, the said wheel having a larger effective diameter than the belt connection at the reel.

13. A fishing device as set forth in claim 12 in which a strong resilient rod is connected to said frame having a forward end located appreciably beyond said reel and having means thereon for slidably trained reception of the fishing line thereon.

References Cited in the file of this patent

UNITED STATES PATENTS

| | | |
|---|---|---|
| 374,737 | Geils | Dec. 13, 1887 |
| 624,762 | Doolittle | May 9, 1899 |
| 748,884 | Reichardt | Jan. 5, 1904 |
| 1,018,471 | Zimmerman | Feb. 27, 1912 |
| 2,030,875 | Johnson | Feb. 18, 1936 |
| 2,257,023 | Ray | Sept. 23, 1941 |
| 2,477,800 | Harvey | Aug. 2, 1949 |
| 2,523,592 | Powell et al. | Sept. 26, 1950 |
| 2,559,933 | Briney | July 10, 1951 |
| 2,593,872 | Gohde | Apr. 22, 1952 |
| 2,664,661 | Kohn | Jan. 5, 1954 |